United States Patent
Kim et al.

(10) Patent No.: US 12,174,408 B2
(45) Date of Patent: *Dec. 24, 2024

(54) ANTI-REFLECTIVE FILM, POLARIZING PLATE, AND DISPLAY APPARATUS

(71) Applicant: LG CHEM, LTD., Seoul (KR)

(72) Inventors: So Young Kim, Daejeon (KR); Jinseok Byun, Daejeon (KR); Kyung Moon Ko, Daejeon (KR); Jin Yeung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 882 days.

This patent is subject to a terminal disclaimer.

(21) Appl. No.: 17/275,494

(22) PCT Filed: May 20, 2020

(86) PCT No.: PCT/KR2020/006581
§ 371 (c)(1),
(2) Date: Mar. 11, 2021

(87) PCT Pub. No.: WO2020/242117
PCT Pub. Date: Dec. 3, 2020

(65) Prior Publication Data
US 2022/0120952 A1  Apr. 21, 2022

(30) Foreign Application Priority Data

May 28, 2019 (KR) .................. 10-2019-0062633
May 7, 2020 (KR) .................. 10-2020-0054680

(51) Int. Cl.
*G02B 1/11* (2015.01)
*G02B 1/14* (2015.01)
*G02B 5/30* (2006.01)

(52) U.S. Cl.
CPC .............. *G02B 5/3025* (2013.01); *G02B 1/11* (2013.01); *G02B 1/14* (2015.01); *G02B 5/3041* (2013.01);
(Continued)

(58) Field of Classification Search
CPC .. G02B 1/11; G02B 2207/101; G02B 5/3025; G02B 5/3083; G02B 1/14; G02B 5/3033; G02B 5/3041
See application file for complete search history.

(56) References Cited

U.S. PATENT DOCUMENTS 5,759,651 A  6/1998  Machii et al.
6,602,593 B1  8/2003  Callahan et al.
(Continued)

FOREIGN PATENT DOCUMENTS

JP  S62-197424 A  9/1987
JP  H08-244750 A  9/1996
(Continued)

OTHER PUBLICATIONS

CN 104602906 (Year: 2015).*
(Continued)

*Primary Examiner* — Lawrence D Ferguson
(74) *Attorney, Agent, or Firm* — ROTHWELL, FIGG, ERNST & MANBECK, P.C.

(57) ABSTRACT

The present disclosure relates to an anti-reflective film capable of realizing high scratch resistance and anti-fouling property simultaneously while having low reflectance and high light transmittance deviation, and further capable of enhancing screen sharpness of a display apparatus, a polarizing plate and a display apparatus including the same.

15 Claims, 2 Drawing Sheets

(52) U.S. Cl.
CPC ...... *G02B 5/3083* (2013.01); *G02B 2207/101* (2013.01)

(56) References Cited

U.S. PATENT DOCUMENTS

| | | | |
|---|---|---|---|
| 9,069,197 | B2 | 6/2015 | Kuroda et al. |
| 9,250,371 | B2 | 2/2016 | Won et al. |
| 9,291,850 | B2 | 3/2016 | Kim et al. |
| 9,358,768 | B2 | 6/2016 | Shin et al. |
| 9,529,122 | B2 | 12/2016 | Kang et al. |
| 9,995,953 | B2 | 6/2018 | Kuroda et al. |
| 10,042,194 | B2 | 8/2018 | Kuroda et al. |
| 10,048,522 | B2 | 8/2018 | Kuroda et al. |
| 10,409,105 | B2 | 1/2019 | Kuroda et al. |
| 2003/0002154 | A1 | 1/2003 | Trapani et al. |
| 2004/0247918 | A1 | 12/2004 | Hashimoto |
| 2006/0052565 | A1 | 3/2006 | Yoshioka et al. |
| 2007/0134459 | A1 | 6/2007 | Hubert et al. |
| 2008/0292866 | A1 | 11/2008 | Shinohara et al. |
| 2010/0215943 | A1 | 8/2010 | Shinohara et al. |
| 2012/0229423 | A1 | 9/2012 | Takamiya et al. |
| 2012/0295040 | A1 | 11/2012 | Kuki |
| 2014/0133033 | A1 | 5/2014 | Shim et al. |
| 2015/0355382 | A1 | 12/2015 | Henn et al. |
| 2016/0062011 | A1 | 3/2016 | Shin et al. |
| 2016/0062012 | A1 | 3/2016 | Shin et al. |
| 2016/0077239 | A1 | 3/2016 | Asahi et al. |
| 2016/0349424 | A1 | 12/2016 | Hong |
| 2016/0368252 | A1 | 12/2016 | Sargeant et al. |
| 2017/0235024 | A1 | 8/2017 | Xu et al. |
| 2018/0194912 | A1 | 7/2018 | Kim et al. |
| 2018/0217297 | A1 | 8/2018 | Kim et al. |
| 2018/0230316 | A1 | 8/2018 | Kim et al. |
| 2018/0230317 | A1 | 8/2018 | Seo et al. |
| 2019/0004214 | A1 | 1/2019 | Kim et al. |
| 2019/0101670 | A1 | 4/2019 | Byun et al. |
| 2019/0154882 | A1 | 5/2019 | Byun et al. |
| 2019/0154883 | A1 | 5/2019 | Byun et al. |
| 2020/0241173 | A1 | 7/2020 | Byun et al. |
| 2020/0348450 | A1 | 11/2020 | Byun et al. |
| 2021/0206935 | A1 | 7/2021 | Byun et al. |
| 2021/0206936 | A1 | 7/2021 | Kim et al. |
| 2021/0223438 | A1 | 7/2021 | Beak et al. |
| 2021/0309863 | A1 | 10/2021 | Byun et al. |
| 2022/0120952 | A1 | 4/2022 | Kim et al. |

FOREIGN PATENT DOCUMENTS

| | | | |
|---|---|---|---|
| JP | 2001-122998 | A | 5/2001 |
| JP | 2002-331575 | A | 11/2002 |
| JP | 2004-533654 | A | 11/2004 |
| JP | 2005-014584 | A | 1/2005 |
| JP | 2006-063147 | A | 3/2006 |
| JP | 2006-240292 | A | 9/2006 |
| JP | 2006-256321 | A | 9/2006 |
| JP | 2006-324059 | A | 11/2006 |
| JP | 2007-241661 | A | 9/2007 |
| JP | 2007-322779 | A | 12/2007 |
| JP | 2009-237097 | A | 10/2009 |
| JP | 2011-053271 | A | 3/2011 |
| JP | 4678635 | B2 | 4/2011 |
| JP | 2013-076841 | A | 4/2013 |
| JP | 2014-182359 | A | 9/2014 |
| JP | 2015-108737 | A | 6/2015 |
| JP | 2015-129936 | A | 7/2015 |
| JP | 2015-200888 | A | 11/2015 |
| JP | 2016-014770 | A | 1/2016 |
| JP | 6039168 | B2 | 12/2016 |
| JP | 6042059 | B2 | 12/2016 |
| JP | 2017-067807 | A | 4/2017 |
| JP | 2017-105985 | A | 6/2017 |
| JP | 2017-219861 | A | 12/2017 |
| JP | 2018-032011 | A | 3/2018 |
| JP | 6297247 | B2 | 3/2018 |
| JP | 2018-525667 | A | 9/2018 |
| JP | 2018-533065 | A | 11/2018 |
| JP | 2019-502163 | A | 1/2019 |
| JP | 2019-079058 | A | 5/2019 |
| KR | 10-2008-0059262 | A | 6/2008 |
| KR | 10-2010-0121281 | A | 11/2010 |
| KR | 10-2013-0010330 | A | 1/2013 |
| KR | 10-2014-0031103 | A | 3/2014 |
| KR | 10-2014-0140770 | A | 12/2014 |
| KR | 10-2015-0003709 | A | 1/2015 |
| KR | 10-2016-0004197 | A | 1/2016 |
| KR | 10-2016-0027500 | A | 3/2016 |
| KR | 10-2016-0028594 | A | 3/2016 |
| KR | 10-2016-0040051 | A | 4/2016 |
| KR | 10-2016-0139667 | A | 12/2016 |
| KR | 20170063674 | A | 6/2017 |
| KR | 10-2017-0082918 | A | 7/2017 |
| KR | 10-2017-0106923 | A | 9/2017 |
| KR | 10-2018-0086027 | A | 7/2018 |
| KR | 10-2019-0003441 | A | 1/2019 |
| KR | 10-2040223 | B1 | 11/2019 |
| KR | 10-2020-0136819 | A | 12/2020 |
| KR | 10-2020-0136839 | A | 12/2020 |
| TW | I491577 | B | 7/2015 |
| WO | 2011-083690 | A1 | 7/2011 |
| WO | 2018/110625 | A1 | 6/2018 |
| WO | 2020-080858 | A1 | 4/2020 |

OTHER PUBLICATIONS

Sasaki et al., "Development and Application Development of Cosmoshine SRF Super Retardation Film," The 117th Plastic Film Research Society, Meeting abstract, The Society of Polymer Science, Japan, 2018, p. 3-4 with relevant parts in English, 8 pages.
Research Group on Plastic Films, The 117th Plastic Film Research Society—The Society of Polymer Science, 2018, <retrieved from https://main.spsj.or.jp/c12/gyoji/film.phpa>, 8 pages.
Dulmage, et al., "Structure of drawn polyethylene terephthalate", Journal of Polymer Science, 3(1958), vol. 1(123), 499-512.
Toyobo, "Super birefringent polyester film, Cosmoshine SRF", 2 pages, retrieved from <https://www.toyobo.co.jp/products/ind_film/optics/cosmoshine_srf/index.html> on Apr. 29, 2022, with partial English translation (3 pages).
Toyobo, "Cosmo Shine○r Super Retardation Film (SRF) type", Ideas & Chemistry, Toyobo, 2013, with partial English translation (2 pages).
Okada et al., "Oriented Structure of Uniaxially Rolled Poly(ethylene terephthalate) Filme", Kobunshi Ronbunshu, (2014) vol. 71, No. 11, pp. 593-600 with partial English translation (10 pages).
Sakurada et al., "Experimental Determination of Elastic Moduli of the Crystalline Regions in the Direction Perpendicular to the Chain Axis in Oriented Polymers: V. Polyethylene Terephthalate and its Popolymers", Polymer Chemistry (1969) vol. 26, Issue 296, pp. 823-832, with partial English translation (11 pages).
Sasaki et al., "Development and application of super birefringent film "Cosmoshine SRF"", The Society of Polymer Science, Japan, 2018, pp. 3-4, with partial English translation (5 pages).
Faraj, et al., "Optical and Structural Properties of Thermally Evaporated Zinc Oxide Thin Films on" Polyethylene Terephthalate Substrates, International Journal of Polymer Science, (2011) vol. 2011, Article ID 302843, 4 page with English translation (9 pages).
International Search Report issued for International Application No. PCT/KR2020/006893 on Sep. 28, 2020, 5 pages.
International Search Report issued for International Application No. PCT/KR2020/006581 on Aug. 28, 2020, 6 pages.

* cited by examiner

[FIG. 1]
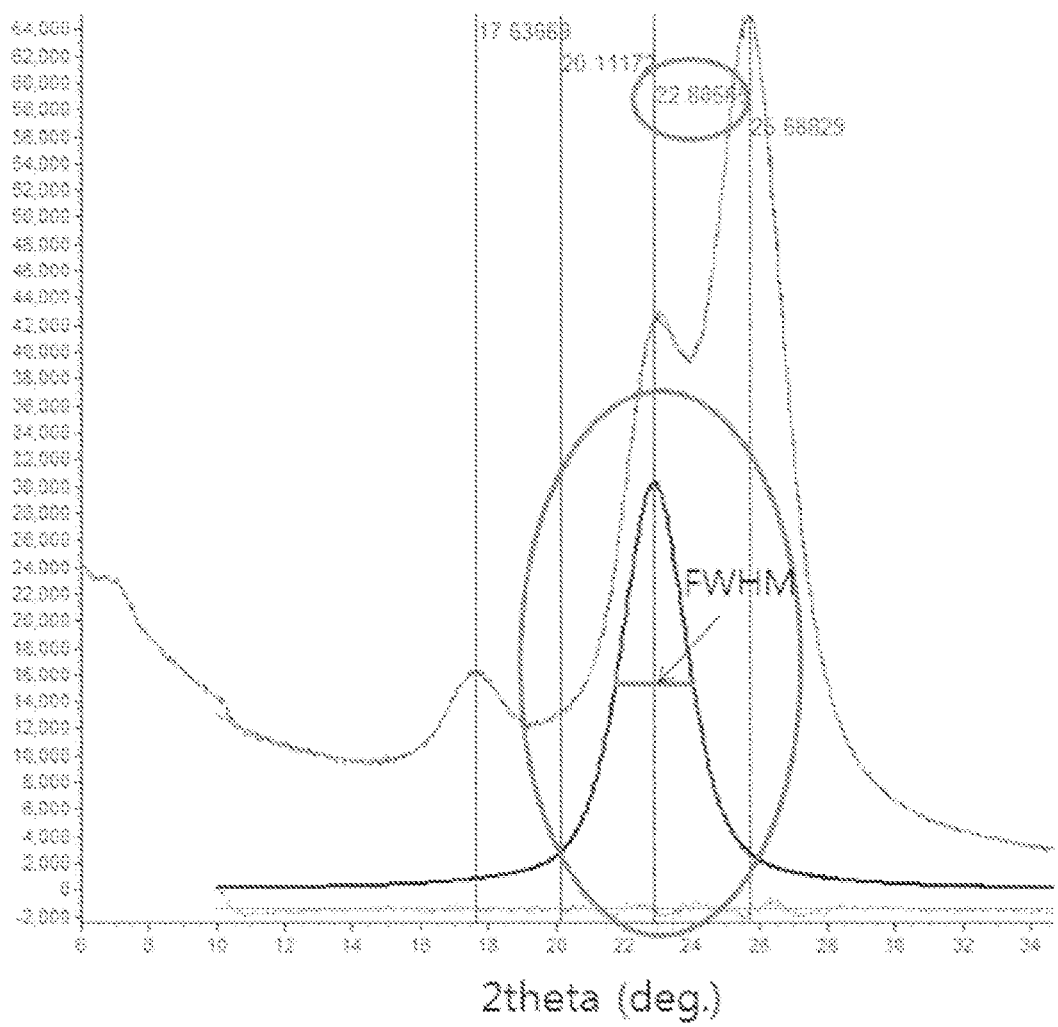

[FIG. 2]
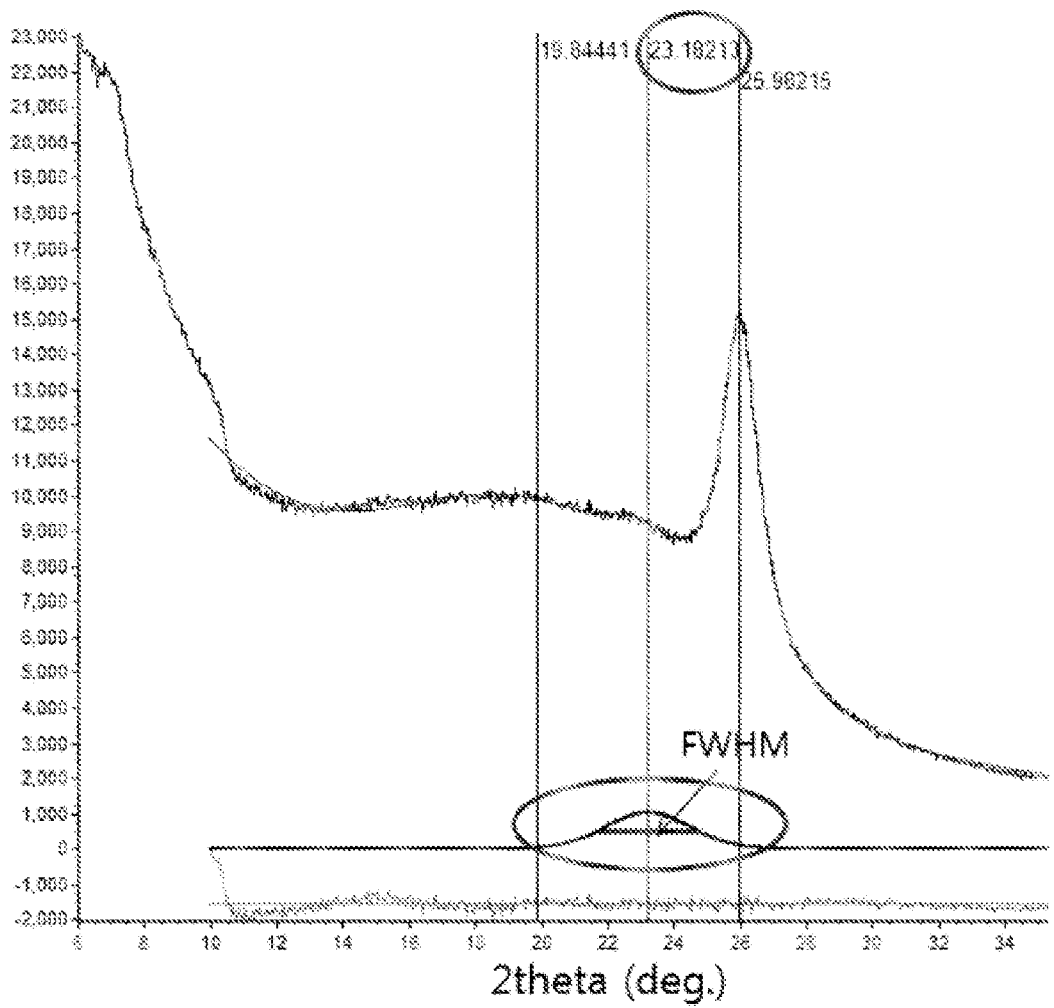

ANTI-REFLECTIVE FILM, POLARIZING PLATE, AND DISPLAY APPARATUS

CROSS-REFERENCE TO RELATED APPLICATION(S)

This application is a 35 U.S.C. 371 National Phase Entry application from PCT/KR2020/006581, filed on May 20, 2020 and designating the United States, which claims the benefit of Korean Patent Application No. 10-2019-0062633 filed on May 28, 2019 and Korean Patent Application No. 10-2020-0054680 filed on May 7, 2020 with the Korean Intellectual Property Office, the disclosures of which are incorporated herein by reference in their entirety.

FIELD OF THE INVENTION

The present disclosure relates to an anti-reflective film, a polarizing plate and a display apparatus.

BACKGROUND OF THE INVENTION

In general, a flat panel display apparatus such as a PDP or a LCD is equipped with an anti-reflective film for minimizing the reflection of light incident from the outside. As a method for minimizing the reflection of light, there exist a method (anti-glare: AG coating) in which a filler such as a inorganic fine particle is dispersed in a resin and coated onto a substrate film to impart irregularities; a method (anti-reflection: AR coating) of using the interference of light by forming a plurality of layers having different refractive indexes on a substrate film; or a method for mixing them, etc.

Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have been conducted recently.

As for a film using the AR coating, a multi-layer structure in which a hard coat layer (high refractive index layer), a low reflective coating layer, and the like are laminated on a substrate film has been commercialized. However, the method of forming a plurality of layers has disadvantages in that as the process for forming each layer is performed separately, the interlayer adhesion force (interfacial adhesion) is weak, and thus the scratch resistance is lowered. Therefore, conventionally, in order to improve the scratch resistance of the low refractive index layer included in the anti-reflective film, a method of adding various particles with a size of nanometers (for example, particles of silica, alumina, zeolite, etc.) had been mainly attempted. However, when the nanometer-sized particles were used as described above, there was a limitation in increasing the scratch resistance simultaneously while lowering the reflectance of the low refractive index layer, and the anti-fouling property of the surface of the low refractive index layer was greatly reduced due to the particles with a size of nanometers.

On the other hand, the light-transmitting base film, which is known to be commonly used for anti-reflective films, has a limitation in that the optical property deviation is great.

BRIEF SUMMARY OF THE INVENTION

The present disclosure provides an anti-reflective film capable of realizing high scratch resistance and anti-fouling property simultaneously while having low reflectance and high light transmittance deviation, and further capable of enhancing screen sharpness of a display apparatus.

The present disclosure also provides a polarizing plate including the aforementioned anti-reflective film.

The present disclosure further provides a display apparatus including the aforementioned anti-reflective film.

Provided herein is an anti-reflective film including a light-transmitting substrate; a hard coating layer; and a low refractive index layer, wherein in X-ray diffraction (XRD) pattern of a reflection mode, a full width at half maximum (FWHM) of the peak appearing at the 2θ value of 22 to 24° is 1.5° or less.

Also provided herein is a polarizing plate including the aforementioned anti-reflective film.

Further provided herein is a display apparatus including the aforementioned anti-reflective film.

DETAILED DESCRIPTION OF THE INVENTION

Hereinafter, an anti-reflective film according to a specific embodiment of the present disclosure, a polarizing plate and a display apparatus including the same will be described in more detail.

As used herein, terms such as first, second, and the like may be used to describe various components, and the terms are used only to discriminate one component from another component.

Further, the low refractive index layer may mean a layer having a low refractive index, and for example, may mean a layer exhibiting a refractive index of about 1.2 to 1.8 at a wavelength of 550 nm.

Further, the peak refers to a portion where the maximum value (or extreme value) of y appears when changing the value of x and recording the value of y thereto with respect to specific measured quantities x and y. At this time, the maximum value means the largest value at the peripheral portion, and the extreme value means the value at which the instantaneous rate of change is 0.

Further, the full width at half maximum (FWHM) means the distance between the two points at the intersection of the straight line and the curve when a straight line parallel to the x coordinate is drawn while passing through a point that is ½ of the y coordinate value of the peak height.

Further, the hollow inorganic particles refer to particles in a form in which an empty space exists on the surface of and/or inside the inorganic particles.

Further, a (meth)acrylate is meant to include both acrylate and methacrylate.

In addition, a (co)polymer is meant to include both a co-polymer and a homo-polymer.

Further, a fluorine-containing compound means a compound including at least one fluorine atom in the compound.

Further, a photopolymerizable compound collectively refers to a polymer resin that is polymerized by irradiation with light, for example, by irradiation with visible light or ultraviolet light.

According to one embodiment of the present disclosure, there can be provided an anti-reflective film including a light-transmitting substrate; a hard coating layer; and a low refractive index layer, wherein in X-ray diffraction (XRD) pattern of a reflection mode, a full width at half maximum (FWHM) of the peak appearing at the 2θ value of 22 to 24° is 1.5° or less.

The present inventors performed studies on an anti-reflective film and found through experiments that an anti-reflective film wherein in X-ray diffraction (XRD) pattern of a reflection mode, a full width at half maximum (FWHM) of the peak appearing at the 2θ value of 22 to 24° is 1.5° or less, not only exhibits similar reflectance and light transmittance in the entire anti-reflective film, so that the variation in reflectance and light transmittance is small, but also can simultaneously realize high scratch resistance and anti-fouling properties, and further has a screen sharpness of a display apparatus, thereby completing the present disclosure.

The anti-reflective film has a small deviation in reflectance and light transmittance in the entire film, and thus, the screen sharpness of the display apparatus can be increased, and at the same time, has excellent scratch resistance and high anti-fouling properties, and thus, can be easily applied to a display apparatus or a polarizing plate manufacturing process without particular limitation.

Specifically, the X-ray diffraction pattern may be calculated using a reflection mode in the X-ray irradiation mode.

In X-ray diffraction (XRD) pattern in the reflection mode obtained from the anti-reflective film according to the one embodiment, the full width at half maximum (FWHM) of the peak appearing at a 2θ value of 22 to 24° may be 1.5° or less, 1.49° or less, 1.3 to 1.45°. Accordingly, a similar reflectance and transmittance may be exhibited in the entire anti-reflective film, and an anti-reflective film having a low reflectance and transmittance deviation may be implemented, and scratch or anti-fouling properties can also be improved.

In the X-ray diffraction pattern of the reflection mode of the anti-reflective film, a peak at a 2θ value of 22 to 24° appears when the polymer chains contain a very well-aligned (arranged) light-transmitting substrate. Thus, the anti-reflective film having such a peak may have excellent optical properties. Further, when the full width at half maximum of the peak appears at 1.5° or less, the crystallite size of the crystal plane of the light-transmitting substrate included in the anti-reflective film is large, and the anti-reflective film including the same is excellent in optical properties and thus, can have low reflectance deviation.

In the X-ray diffraction pattern of the reflection mode of the anti-reflective film, when no peak appears at a 2θ value of 22 to 24°, the polymer chains in the light-transmitting substrate included in the anti-reflective film may be arranged with a low degree of alignment. When the full width at half maximum of the peak exceeds 1.5°, the crystallite size of the crystal plane of the light-transmitting substrate included in the anti-reflective film grows very small. The optical properties of the anti-reflective film including such a light-transmitting substrate are deteriorated, which may cause a problem that reflectance deviation is high.

On the other hand, the incidence angle (θ) refers to an angle formed between the crystal plane and the X-ray when X-rays are irradiated onto a specific crystal plane. The diffraction peak is 2θ value of the incident angle of X-rays on which the horizontal axis (x-axis) in the x-y plane is made incident, and on a graph where the vertical axis (y-axis) in the x-y plane is a diffraction intensity, it refers to the point where the first derivative value (the slope of the tangent line, dy/dx) is 0, in which as the 2θ values of the incident angle of X-ray, which is a horizontal axis (x-axis), increase in a positive direction, the first derivative value (slope of tangent, dy/dx) of the (2θ) value of the incident angle of X-ray, which is a horizontal axis (x-axis), to the diffraction intensity, which is a vertical axis (y-axis), changes from a positive value to a negative value.

The 2θ value of the peak is due to the specific interplanar distance (d-spacing) in the crystal of the polymer in the light-transmitting substrate, and the full width at half maximum of the peak may be due to the size of the polymer crystal in the light-transmitting substrate.

Specifically, the specific interplanar distance (d-spacing) in the light-transmitting substrate can be confirmed from the 2θ value of the peak appearing in X-ray diffraction (XRD) pattern of a reflection mode. More specifically, in the case of a Cu target and a wavelength (λ) of 1.54 Å, a (−110) crystal plane in the light-transmitting substrate may appear as a peak at the 2θ value of 22 to 24°.

In addition, the size of the polymer crystal in the light-transmitting substrate may affect the full width at half maximum of the peak appearing at the 2θ value of 22 to 24°. The smaller the full width at half maximum, the larger the size of the polymer crystal in the light-transmitting substrate, whereby the corresponding crystal planes of the polymer in the light-transmitting substrate may be arranged with a high degree of alignment.

The low refractive index layer included in the anti-reflective film according to the one embodiment may include a binder resin and inorganic nanoparticles dispersed in the binder resin.

Meanwhile, the binder resin may include a (co)polymer of a photopolymerizable compound. The photopolymerizable compound forming the binder resin may include a monomer or oligomer containing a (meth)acrylate group or a vinyl group. Specifically, the photopolymerizable compound may include a monomer or an oligomer containing one or more, or two or more, or three or more (meth)acrylate groups or vinyl groups.

Specific examples of the monomer or oligomer containing a (meth)acrylate group include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylol propane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate or a mixture of two or more thereof, or alternatively epoxide acrylate oligomer, ether acrylate oligomer, dendritic acrylate oligomer, or a mixture of two or more thereof. In this case, the molecular weight of the oligomer may be 1,000 to 10,000.

Specific examples of the monomer or oligomer containing a vinyl group include divinylbenzene, styrene, or para-methylstyrene.

The content of the part derived from the photopolymerizable compound in the binder resin is not particularly limited. However, considering the mechanical properties of the finally produced low refractive index layer or the anti-refractive film, the content of the photopolymerizable compound may be 10 to 80% by weight, 15 to 70% by weight, 20 to 60% by weight, or 30 to 50% by weight.

When the content of the photopolymerizable compound is less than 10% by weight, the scratch resistance and anti-fouling property of the low refractive index layer may be greatly reduced, and when the content of the photopolymerizable compound exceeds 80% by weight, there is a problem that reflectance increases.

Meanwhile, the binder resin may further include a cross-linked polymer between a photopolymerizable compound and a fluorinated compound containing a photoreactive functional group.

Due to the properties arising from the fluorine element contained in the fluorine-containing compound including the photoreactive functional group, the anti-refractive film may have lowered interaction energy with organic materials, and thus the amount of pollutants transferred to the anti-refractive film can be significantly reduced, transferred pollutants can be prevented from remaining on the surface, and the pollutants can be easily removed.

Further, in the process of forming the low refractive index layer and the anti-reflective film, the reactive functional groups included in the fluorine-containing compound including a photoreactive functional group undergo a cross-linking action, and thus the physical durability, scratch resistance and thermal stability of the low refractive index layer and the anti-reflective film can be improved.

In the fluorine-containing compounds including photoreactive functional groups, one or more photoreactive functional groups may be included or substituted, and the term "photoreactive functional group" means a functional group capable of participating in a polymerization reaction by the irradiation of light, for example, irradiation of visible light or UV. The photoreactive functional group may include various functional groups known to be capable of participating in a polymerization reaction by the irradiation of light, and specific examples thereof may include a (meth) acrylate group, an epoxide group, a vinyl group, and a thiol group.

The fluorine-containing compounds including photoreactive functional groups may have a weight average molecular weight (in terms of polystyrene measured by GPC) of 2000 to 200,000, and preferably 5000 to 100,000.

If the weight average molecular weight of the fluorine-containing compounds including photoreactive functional groups is too small, the fluorine-containing compounds may not be uniformly and effectively arranged on the surface of the low refractive index layer and be positioned inside, whereby the anti-fouling property of the low refractive index layer and the anti-reflective film may be deteriorated and the crosslinking density inside the low refractive index layer and anti-reflective film may be lowered, thus deteriorating mechanical properties such as total strength or scratch resistance, etc. Further, if the weight average molecular weight of the fluorine-containing compounds including photoreactive functional groups is too high, the haze of the low refractive index layer and the anti-reflective film may increase or the light transmittance may be lowered, and the strength of the low refractive index layer and anti-reflective film may also be deteriorated.

Specifically, the fluorine-containing compounds including photoreactive functional groups may include one or more selected from the group consisting of: i) aliphatic compounds or alicyclic compounds substituted by one or more photoreactive functional groups, in which at least one carbon is substituted by one or more fluorine atoms; ii) heteroaliphatic compounds or heteroalicyclic compounds substituted by one or more photoreactive functional groups, in which at least one hydrogen is substituted by fluorine, and at least one carbon is substituted by silicon; iii) a polydialkyl siloxane-based polymer (for example, a polydimethyl siloxane-based polymer) substituted by one or more photoreactive functional groups, in which at least one silicon atom is substituted by one or more fluorine atoms; and iv) polyether compounds substituted by one or more photoreactive functional groups, in which at least one hydrogen is substituted by fluorine.

The binder resin included in the low refractive index layer may include a cross-linked polymer of a photopolymerizable compound and a fluorine-containing compound including photoreactive functional groups.

The cross-linked polymer may include, based on 100 parts by weight of the parts derived from the photopolymerizable compound, 1 to 300 parts by weight, 2 to 250 parts by weight, 3 to 200 parts by weight, 5 to 190 parts by weight, or 10 to 180 parts by weight of the parts derived from the fluorine-containing compound including photoreactive functional groups. The content of the fluorine-containing compounds including photoreactive functional groups with respect to the photopolymerizable compound is based on the total content of fluorine-containing compounds including photoreactive functional groups. If the fluorine-containing compounds including photoreactive functional groups are excessively added compared to the photopolymerizable compound, the low refractive index layer may not have sufficient durability or scratch resistance. In addition, if the content of the fluorine-containing compounds including photoreactive functional groups is too small compared to the photopolymerizable compound, the low refractive index layer may not have sufficient mechanical properties such as anti-fouling property or scratch resistance, etc.

The fluorine-containing compound including a photoreactive functional group may further include silicon or a silicon-containing compound. That is, the fluorine-containing compound including a photoreactive functional group may optionally contain silicon or a silicon-containing compound inside, and specifically, the content of silicon in the fluorine-containing compound including a photoreactive functional group may be 0.1 wt % to 20 wt %.

The content of silicon or a silicon-containing compound respectively included in the fluorine-containing compound including a photoreactive functional group can be confirmed through commonly known analysis methods, for example ICP [inductively coupled plasma] analysis.

The silicon included in the fluorine-containing compound including a photoreactive functional group may increase compatibility with other components included in the photocurable coating composition, and thus may prevent the generation of haze in the finally prepared low refractive index layer, thereby increasing transparency, and furthermore, may improve the slip property of the surface of the finally prepared low refractive index layer or anti-reflective film, thereby increasing scratch resistance.

Meanwhile, if the content of silicon in the fluorine-containing compound including a photoreactive functional group becomes too high, the low refractive index layer or anti-reflective film may not have sufficient light transmittance or anti-reflective performance, and the anti-fouling property of the surface may be deteriorated.

Further, the binder resin may further include a crosslinked polymer of a photopolymerizable compound, a fluorine-containing compounds including photoreactive functional groups, and polysilsesquioxane substituted by one or more reactive functional groups.

Meanwhile, the polysilsesquioxane substituted by one or more reactive functional groups has reactive functional groups on the surface, and thus may increase mechanical properties of the low refractive index layer, for example, scratch resistance, and unlike the case wherein previously known fine particles such as silica, alumina, zeolite, etc. are used, may improve alkali resistance of the low refractive index layer, and improve mean reflectance or appearance properties such as a color, etc.

The polysilsesquioxane may be represented by $(RSiO_{1.5})n$ (wherein n is 4 to 30 or 8 to 20), and may have various structures such as random, ladder, cage, partial cage, etc.

Preferably, in order to increase the properties and qualities of the low refractive index layer and anti-reflective film, polyhedral oligomeric silsesquioxane that is substituted by one or more reactive functional groups and has a cage structure may be used as the polysilsesquioxane substituted by one or more reactive functional groups.

More preferably, the polyhedral oligomeric silsesquioxane that is substituted by one or more reactive functional groups and has a cage structure may include 8 to 20 silicon atoms in the molecule.

In the polyhedral oligomeric silsesquioxane having a cage structure, at least one silicon atom may be substituted by a reactive functional group, and remaining silicon atoms that are not substituted by a reactive functional group may be substituted by unreactive functional groups.

As at least one silicon atom of the polyhedral oligomeric silsesquioxane having a cage structure is substituted by a reactive functional group, the mechanical properties of the low refractive index layer and the binder resin may be improved, and furthermore, as remaining silicon atoms are substituted by unreactive functional groups, the molecular structural has steric hindrance, thus significantly lowering the frequency or probability of a siloxane bond (—Si—O—) being exposed outside, thereby improving alkali resistance of the low refractive index layer and the binder resin.

The reactive functional group substituted in the polysilsesquioxane may include one or more functional groups selected from the group consisting of alcohol, amine, carboxylic acid, epoxide, imide, (meth)acrylate, nitrile, norbornene, olefin [allyl, cycloalkenyl, vinyldimethylsilyl, etc.], polyethylene glycol, thiol, and vinyl groups, and preferably, may be epoxide or (meth)acrylate.

More specific examples of the reactive functional group may include (meth)acrylate, a C1-20 alkyl (meth)acrylate, a C3-20 cycloalkyl epoxide, and a C1-10 alkyl cycloalkane epoxide. The alkyl (meth)acrylate means that another part of the "alkyl" that is not bonded to (meth)acrylate is a bonding site, the cycloalkyl epoxide means that another part of the "cycloalkyl" that is not bonded to epoxide is a bonding site, and alkyl cycloalkane epoxide means that another part of the "alkyl" that is not bonded to cycloalkane epoxide is a bonding site.

Meanwhile, the polysilsesquioxane substituted by one or more reactive functional groups may further include one or more unreactive functional groups selected from the group consisting of a C1-20 linear or branched alkyl group, a C6-20 cyclohexyl group, and a C6-20 aryl group, in addition to the above-explained reactive functional groups. As the polysilsesquioxane is substituted by a reactive functional group and an unreactive functional group on the surface, in the polysilsesquioxane substituted by one or more reactive functional groups, a siloxane bond (—Si—O—) is positioned inside of the molecule and is not exposed outside, thus further increasing alkali resistance and scratch resistance of the low refractive index layer and the anti-reflective film.

Examples of the polyhedral oligomeric silsesquioxane (POSS) that is substituted by one or more reactive functional groups and has a cage structure may include: POSS substituted by one or more alcohols such as TMP diolisobutyl POSS, cyclohexanediol isobutyl POSS, 1,2-propanediolisobutyl POSS, octa(3-hydroxy-3 methyl butyldimethylsiloxy) POSS, etc.; POSS substituted by one or more amines such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS substituted by one or more carboxylic acids such as maleamic acid-cyclohexyl POSS, maleamic acid-isobutyl POSS, octa maleamic acid POSS, etc.; POSS substituted by one or more epoxides such as epoxycyclohexylisobutyl POSS, epoxycyclohexyl POSS, glycidyl POSS, glycidylethyl POSS, glycidylisobutyl POSS, glycidylisooctyl POSS, etc.; POSS substituted by one or more imides such as POSS maleimide cyclohexyl, POSS maleimide isobutyl, etc.; POSS substituted by one or more (meth)acrylates such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acrylisooctyl POSS, (meth)acrylphenyl POSS, (meth)acryl POSS, acrylo POSS, etc.; POSS substituted by one or more nitrile groups such as cyanopropylisobutyl POSS, etc.; POSS substituted by one or more norbornene groups such as norbornenylethylethyl POSS, norbornenylethylisobutyl POSS, norbornenylethyl disilanoisobutyl POSS, trisnorbornenyl isobutyl POSS, etc.; POSS substituted by one or more vinyl groups such as allylisobutyl POSS, monovinylisobutyl POSS, octacyclohexenyldimethylsilyl POSS, octavinyldimethylsilyl POSS, octavinyl POSS, etc.; POSS substituted by one or more olefins such as allylisobutyl POSS, monovinylisobutyl POSS, octacyclohexenyldimethylsilyl POSS, octavinyldimethylsilyl POSS, octavinyl POSS, etc.; POSS substituted by a C5-30 PEG; POSS substituted by one or more thiol groups such as mercaptopropylisobutyl POSS or mercaptopropylisooctyl POSS, etc.; and the like.

The cross-linked polymer of a photopolymerizable compound, two or more kinds of fluorine-containing compounds including photoreactive functional groups, and polysilsesquioxane substituted by one or more reactive functional groups may include, based on 100 parts by weight of the photopolymerizable compound, 0.5 to 60 parts by weight, or 1.5 to 45 parts by weight, or 3 to 40 parts by weight, or 5 to 30 parts by weight of the polysilsesquioxane substituted by one or more reactive functional groups.

If the content of the parts derived from the polysilsesquioxane substituted by one or more reactive functional groups is too small compared to the parts derived from the photopolymerizable compound in the binder resin, it may be difficult to sufficiently secure scratch resistance of the low refractive index layer. Further, if the content of the parts derived from the polysilsesquioxane substituted by one or more reactive functional groups is too high compared to the parts derived from the photopolymerizable compound in the binder resin, transparency of the low refractive index layer or the anti-reflective film may be deteriorated, and scratch resistance may be rather deteriorated.

Meanwhile, the low refractive index layer included in the anti-reflective film according to the one embodiment may include inorganic fine particles dispersed in the binder resin. The inorganic fine particles mean inorganic particles having a diameter of a nanometer or micrometer unit.

Specifically, the inorganic fine particles may include solid inorganic nanoparticles and/or hollow inorganic nanoparticles. The solid inorganic nanoparticles mean particles that have a diameter of 100 nm or less, inside of which an empty space does not exist.

Further, the hollow inorganic nanoparticles mean particles that have a diameter of 200 nm or less, on the surface and/or inside of which an empty space exists.

The solid inorganic nanoparticles may have a diameter of 0.5 to 100 nm, or 1 to 80 nm, or 2 to 70 nm, or 5 to 60 nm.

The hollow inorganic nanoparticles may have a diameter of 1 to 200 nm, or 10 to 150 nm, 20 to 130 nm, 30 to 110 nm or 40 to 100 nm.

Meanwhile, the solid inorganic nanoparticles and the hollow inorganic nanoparticles may respectively contain one or more reactive functional groups selected from the group consisting of a (meth)acrylate group, an epoxide group, a vinyl group, and a thiol group on the surface. As the solid inorganic nanoparticles and the hollow inorganic nanoparticles respectively contain the above-explained reactive functional groups on the surfaces, the low refractive index layer may have a higher cross-linking degree, thus securing more improved scratch resistance and anti-fouling properties.

As the hollow inorganic nanoparticles, particles of which surfaces are coated with a fluorine-based compound may be used alone or in combination with hollow inorganic nanoparticles of which surfaces are not coated with a fluorine-based compound. If the surfaces of the hollow inorganic nanoparticles are coated with a fluorine-based compound, surface energy may be further lowered, thereby further increasing durability or scratch resistance of the low refractive index layer.

As a method of coating the surfaces of the hollow inorganic nanoparticles with a fluorine-based compound, commonly known particle coating methods or polymerization methods, etc. can be used without particular limitations, and for example, by the sol-gel reaction of the hollow inorganic nanoparticles and the fluorine-based compound in the presence of water and a catalyst, the fluorine-based compound may be bonded on the surface of the hollow inorganic nanoparticles through hydrolysis and condensation.

Specific examples of the hollow inorganic nanoparticles may include hollow silica particles. The hollow silica may include a specific functional group substituted on the surface, so as to be more easily dispersed in an organic solvent. Although examples of the organic functional groups that can be substituted on the surface of the hollow silica particles are not particularly limited, for example, a (meth)acrylate group, a vinyl group, a hydroxy group, an amine group, an allyl group, an epoxy group, a hydroxy group, an isocyanate group, an amine group, fluorine, etc. may be substituted on the surface of the hollow silica.

The binder resin of the low refractive index layer may include, based on 100 parts by weight of the photopolymerizable compound, 10 to 600 parts by weight, 20 to 550 parts by weight, 50 to 500 parts by weight, 100 to 400 parts by weight or 150 to 350 parts by weight of the inorganic fine particles. If the inorganic fine particles are excessively added, due to a decrease in the content of binder, scratch resistance or abrasion resistance of the coating film may be deteriorated.

Meanwhile, the low refractive index layer may be obtained by applying a photocurable coating composition including a photopolymerizable compound, a fluorine-containing compounds including reactive functional groups, a polysilsesquioxane substituted by one or more reactive functional groups and an inorganic fine particle onto the light-transmitting substrate, and photocuring it.

Further, the photocurable coating composition may further include a photoinitiator. Thus, in the low refractive index layer prepared from the above-mentioned photocurable coating composition, the photopolymerization initiator may remain.

As the photopolymerization initiator, compounds known to be usable in a photocurable resin composition may be used without particular limitations, and specifically, a benzophenone-based compound, an acetophenone-based compound, a biimidazole-based compound, a triazine-based compound, an oxime-based compound, or mixture of two or more kinds thereof may be used.

The photopolymerization initiator may be used in the content of 1 to 100 parts by weight, 5 to 90 parts by weight, 10 to 80 parts by weight, 20 to 70 parts by weight, or 30 to 60 parts by weight, based on 100 parts by weight of the photopolymerizable compound. If the content of the photopolymerization initiator is too small, materials that are not cured in the photocuring step and remain may be generated. If the content of the photopolymerization initiator is too high, a non-reacted initiator may remain as an impurity, and cross-linking density may be lowered to deteriorate mechanical properties of the prepared film, or reflectance may significantly increase.

In addition, the photocurable coating composition may further include an organic solvent. Non-limiting examples of the organic solvent may include ketones, alcohols, acetates, ethers, and mixtures of two or more kinds thereof.

Specific examples of the organic solvent may include ketones such as methyl ethyl ketone, methyl isobutyl ketone, acetylacetone, isobutyl ketone, etc.; alcohols such as methanol, ethanol, n-propanol, i-propanol, n-butanol, i-butanol, t-butanol, etc.; acetates such as ethylacetate, i-propylacetate, polyethylene glycol monomethylether acetate, etc.; ethers such as tetrahydrofuran, propylene glycol monomethyl ether, etc.; or mixtures of two or more kinds thereof.

The organic solvent may be added when mixing the components included in the photocurable coating composition, or each component may be added while being dispersed in or mixed with the organic solvent. If the content of the organic solvent in the photocurable coating composition is too small, flowability of the photocurable coating composition may be deteriorated, thus generating defects such as a stripe in the finally prepared film. If the organic solvent is excessively added, the solid content may decrease, thus coating and film formation may not be sufficiently achieved, and the physical properties or surface property of the film may be deteriorated, and defects may be generated in the process of drying and curing. Thus, the photocurable coating composition may include an organic solvent such that the total solid concentration of the included components may become 1 wt % to 50 wt %, or 2 wt % to 20 wt %.

Meanwhile, methods and apparatuses commonly used for the application of the photocurable coating composition may be used without particular limitations, and for example, bar coating such as using a Meyer bar, etc., gravure coating, 2 roll reverse coating, vacuum slot die coating, 2 roll coating, etc. may be used.

In the step of photocuring the photocurable coating composition, UV or visible light of a 200~400 nm wavelength may be irradiated, wherein the exposure amount may preferably be 100 to 4000 mJ/cm$^2$. The exposure time is not particularly limited, and may be appropriately changed according to the exposure apparatus used, the wavelength of irradiated light rays, or the exposure amount.

In the step of photocuring the photocurable coating composition, nitrogen purging, etc. may be conducted so as to apply a nitrogen atmosphere condition.

Meanwhile, as the hard coating layer included in the hard coating film in the above embodiment, commonly known hard coating layers may be used without particular limitations. One example of the hard coating layer may include a hard coating layer including a binder resin including a photocurable resin; and organic or inorganic fine particles dispersed in the binder resin.

The photocurable resin included in the hard coating layer may be a polymer of photocurable compounds capable of causing a polymerization reaction if light such as UV, etc. is irradiated, which may be commonly known in the art. Specifically, the photocurable resin may include one or more selected from the group consisting of: reactive acrylate oligomers such as a urethane acrylate oligomer, an epoxide acrylate oligomer, a polyester acrylate, and a polyether acrylate; and multifunctional acrylate monomers such as dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol acrylate, propoxylated glycerol triacrylate, tripropylene glycol diacrylate, and ethylene glycol diacrylate.

Although the particle diameter of the organic or inorganic fine particles is not specifically limited, for example, the organic fine particles may have a particle diameter of 1 to 10 μm, and the inorganic fine particles may have a particle diameter of 1 nm to 500 nm, or 1 nm to 300 nm. The particle diameter of the organic or inorganic fine particles may be defined as a volume average particle diameter.

Further, although specific examples of the organic or inorganic fine particles included in the hard coating film are not particularly limited, for example, the organic or inorganic fine particles may be organic fine particles selected from the group consisting of acryl-based resin particles, styrene-based resin particles, epoxide resin particles, and nylon resin particles, or inorganic fine particles selected from the group consisting of silicon oxide, titanium dioxide, indium oxide, tin oxide, zirconium oxide, and zinc oxide.

The binder resin of the hard coating layer may further include a high molecular weight (co)polymer having a number average molecular weight of 10,000 or more, 13,000 or more, 15,000 to 100,000, or 20,000 to 80,000. The high molecular weight (co)polymer may be one or more selected from the group consisting of a cellulose-based polymer, an acryl-based polymer, a styrene-based polymer, an epoxide-based polymer, a nylon-based polymer, a urethane-based polymer, and a polyolefin-based polymer.

Meanwhile, another example of the hard coating film may include an organic polymer resin of a photocurable resin; and an antistatic agent dispersed in the organic polymer resin.

The antistatic agent may be quaternary ammonium salt compounds; pyridinium salts; cationic compounds having 1 to 3 amino groups; anionic compounds such as sulfonic acid base, sulfuric ester base, phosphoric ester base, phosphonic acid base and the like; amphoteric compounds such as amino acid-based or aminosulfuric acid ester-based compounds; nonionic compounds such as imino alcohol-based compounds, glycerin-based compounds, polyethylene glycol-based compounds and the like; organometallic compounds such as metal alkoxide compounds including tin, titanium or the like; metal chelate compounds such as an acetylacetonate salt of the organometallic compounds; two or more reactants or polymers of these compounds; and a mixture of two or more of these compounds. Herein, the quaternary ammonium salt compound may be a compound having at least one quaternary ammonium salt group in the molecule, and a low-molecule type or a high-molecule type can be used without limitation.

Further, as the antistatic agent, a conductive polymer and metal oxide fine particles may also be used. The conductive polymer may include aromatic conjugated poly(paraphenylene), heterocyclic conjugated polypyrrole, polythiophene, aliphatic conjugated polyacetylene, conjugated polyaniline containing a hetero atom, mixed-type conjugated poly(phenylene vinylene), conjugated double-chain type conjugated compound having a plurality of conjugated chains in the molecule, a conductive complex obtained by graft or block copolymerization of a conjugated polymer chain with a saturated polymer, and the like. Furthermore, the metal oxide fine particles include zinc oxide, antimony oxide, tin oxide, cerium oxide, indium tin oxide, indium oxide, aluminum oxide, antimony doped-tin oxide, aluminum doped-zinc oxide, and the like.

The hard coating film including an organic polymer resin of the photopolymerizable resin; and an antistatic agent dispersed in the organic polymer resin may further include at least one compound selected from the group consisting of an alkoxysilane-based oligomer and a metal alkoxide-based oligomer.

The alkoxysilane-based compound may be one that is conventional in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer. However, since the metal alkoxide-based compound can rapidly react with water, the sol-gel reaction can be performed by a method of diluting the metal alkoxide-based compound in an organic solvent and then slowly dropping water. At this time, considering the reaction efficiency or the like, the molar ratio (based on metal ion) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The light-transmitting substrate included in the hard coating film according to the one embodiment may be a transparent film having a light transmittance of 90% or more and a haze of 1% or less.

The light-transmitting substrate may have a transmittance of 50% or more at a wavelength of 300 nm or more. Further, the light-transmitting substrate is a polymer film having a low moisture permeability characteristic in which a moisture permeation phenomenon in which moisture moves from a high water vapor pressure to a low water vapor pressure through the film hardly occurs. For example, the light-transmitting substrate has a moisture permeability of 50 $g/m^2 \cdot day$ or less, 30 $g/m^2 \cdot day$ or less, 20 $g/m^2 \cdot day$ or less, or 15 $g/m^2 \cdot day$ less under the conditions of a temperature of 30 to 40° C. and a relative humidity of 90 to 100%. When the moisture permeability of the light-transmitting substrate exceeds 50 $g/m^2 \cdot day$, moisture permeates into the anti-reflective film, and the display to which the anti-reflective film is applied may be deteriorated in a high temperature environment.

As described above, the 2θ value of the peak is due to the specific interplanar distance (d-spacing) in the crystal of the polymer, and may be due to the crystal state of the polymer in the light-transmitting substrate. The full width at half maximum of the peak appearing at the 2θ value of 22 to 24° may be due to the size of the polymer crystal in the light-transmitting substrate.

Further, the specific interplanar distance (d-spacing) and size of the polymer crystal in the light-transmitting substrate is related to the stretching ratio, stretching temperature, and cooling rate after stretching, and the like in the preparation process of the light-transmitting substrate, and may be related to a ratio of tensile strength between one direction of the light-transmitting substrate and a direction perpendicular to the one direction.

Specifically, the light-transmitting substrate exhibits different tensile strength values in one direction and a direction perpendicular to the one direction. For example, the ratio of the tensile strength in a direction perpendicular to the one direction to the tensile strength in one direction may be 2 or more, 2 to 30, 2.1 to 20, 2.2 to 10, or 2.2 to 5.

In this case, the tensile strength in one direction has a value smaller than the tensile strength in a direction perpendicular to the one direction. If the tensile strength ratio is less than 2, a deviation in reflectance and transmittance of each portion of the anti-reflective film may be large, and a rainbow phenomenon due to interference of visible light may occur.

The light-transmitting substrate may have a tensile strength in one direction of 50 to 500 Mpa, 60 to 450 Mpa, or 70 to 400 Mpa.

Further, the tensile strength of the light-transmitting substrate in a direction perpendicular to the one direction may be 50 to 500 Mpa, 60 to 450 Mpa, or 70 to 400 Mpa.

The light-transmitting substrate may have a retardation (Rth) in the thickness direction measured at a wavelength of 400 nm to 800 nm, of 5,000 nm or more, 5,200 to 50,000 nm, 5,400 to 40,000 nm, 5,600 to 30,000 nm, 5,800 to 20,000 nm, or 5,800 to 10,000 nm. Specific examples of such a light-transmitting substrate include a uniaxially stretched polyethylene terephthalate film or a biaxially stretched polyethylene terephthalate film.

If the retardation (Rth) in the thickness direction of the light-transmitting substrate is less than 5,000 nm, deviation in reflectance and transmittance of each part of the anti-reflective film may be large, and a rainbow phenomenon may occur due to interference of visible light.

The retardation in the thickness direction can be confirmed by a commonly known measuring method and measuring apparatus. For example, the retardation (Rth) in the thickness direction can be determined using a measuring apparatus manufactured by AXOMETRICS, Inc. under the trade name of "AxoScan", Prism Coupler and the like.

For example, the retardation (Rth) in the thickness direction can be determined by: inputting a value of a refractive index (589 nm) of the light-transmitting substrate film into the measuring apparatus, then, measuring the thickness-direction retardation of the light-transmitting substrate film by using light at a wavelength of 590 nm under conditions of a temperature: 25° C. and a humidity: 40%; and converting the measured value of the thickness-direction retardation thus determined (the value is measured according to the automatic measurement (automatic calculation) of the measuring apparatus) into a retardation value per 10 μm of the thickness of the film. In addition, the size of the light-transmitting substrate film as the measurement sample is not particularly limited, as long as it is larger than a light measurement unit (diameter: about 1 cm) of a stage of the measuring apparatus. However, the size may be a length: 76 mm, a width: 52 mm, and a thickness: 13 μm.

Further, the value of the "refractive index (589 nm) of the light-transmitting substrate" utilized in the measurement of the thickness-direction retardation (Rth) can be determined by: forming an unstretched film including the same kind of resin film as the light-transmitting substrate for forming the film to be measured for the retardation, and then, measuring the unstretched film as a measurement sample (in the case where the film to be measured is an unstretched film, the film can be directly used as the measurement sample) for the refractive index for light at 589 nm in an in-plane direction (the direction perpendicular to the thickness direction) of the measurement sample by using a refractive index-measuring apparatus (manufactured by Atago Co., Ltd. under the trade name of "NAR-1T SOLID") as a measuring apparatus under a light source of 589 nm and a temperature condition of 23° C.

Further, the material of the light-transmitting substrate may be triacetylcellulose, cycloolefin polymer, poly(meth)acrylate, polycarbonate, polyethylene terephthalate, and the like. Further, the thickness of the substrate film may be 10 to 300 μm in consideration of productivity and the like, but is not limited thereto.

The anti-reflective film of the one embodiment may exhibit a low reflectance, thereby implementing high light transmittance and excellent optical properties. Specifically, the anti-reflective film may have an average reflectance of 2.0% or less, 1.6% or less, 1.2% or less, 0.05% to 0.9%, 0.10% to 0.70%, or 0.2% to 0.5% in the visible light wavelength range of 380 nm to 780 nm.

In addition, the anti-reflective film of the one embodiment may exhibit a low reflectance deviation and light transmittance deviation, thereby implementing excellent optical properties. Specifically, the average reflectance deviation of the anti-reflective film may be 0.2% p or less, 0.01 to 0.18% p, or 0.02 to 0.17% p. Further, the light transmittance deviation of the anti-reflective film may be 0.2% p or less, 0.01 to 0.15% p, or 0.01 to 0.10% p.

The average reflectance deviation refers to the difference (absolute value) between the average reflectance in the visible light wavelength range of 380 to 780 nm of two or more specific portions (points) selected in the anti-reflective film and the average value of the average reflectance. As a method of calculating the average reflectance deviation, specifically, 1) two or more points in the anti-reflective film are selected, 2) the average reflectance is measured at each of the two or more points, 3) the arithmetic mean of the average reflectance measured in step 2) is calculated, and 4) the difference (absolute value) between the average reflectance of each point and the arithmetic mean of step 3) is calculated, and finally, the deviation of two or more average reflectances can be calculated. In this case, the average reflectance deviation having the largest value among the deviations of the two or more average reflectances may be 0.2% p or less.

Meanwhile, the light transmittance deviation refers to a difference (absolute value) between the transmittance of two or more specific parts (points) selected in the anti-reflective film and the average value of the transmittance, and the transmittance deviation may be calculated in the same manner as the method of calculating the average reflectance deviation, except that the light transmittance is measured instead of measuring the average reflectance. In this case, the greatest value among the two or more light transmittance deviations may be 0.2% p or less.

According to another embodiment of the present disclosure, a polarizing plate including the anti-reflective film may be provided. The polarizing plate may include a polarizer and an anti-reflective film formed on at least one surface of the polarizer.

According to yet another embodiment of the invention, there can be provided a polarizing plate comprising a polarizer, and a second hard coating layer having a thickness of 10 μm or less and the anti-reflective film according to claim 1 positioned opposite to each other around the polarizer.

A detailed description of the anti-reflective film and a detailed description and specific examples of components included therein are as described above.

The polarizing plate may be manufactured using components and manufacturing methods known in the art to which the present disclosure pertains, except that a second hard coating layer having a thickness of 10 μm or less, a polarizer, and the anti-reflective film are sequentially laminated. For example, in the polarizing plate, a second hard coating layer having a thickness of 10 μm or less, a polarizer, a light-transmitting substrate, a hard coating layer, and a low refractive index layer may be sequentially laminated.

Previously known polarizing plates have a structure in which triacetyl cellulose (TAC) films or the like are located on both sides around the polarizer, but the triacetyl cellulose film has a problem that it has poor water resistance, can be distorted in a high temperature/high humidity environment and induces defects such as light leakage.

However, in the polarizing plate according to another embodiment, a light-transmitting substrate having the above-described characteristics is located on one side of the polarizer, and a second hard coating layer having a thickness of 10 μm or less is located on the other side of the polarizer, so that even if the polarizing plate is exposed for a long time under high temperature and high humidity conditions, water transfer toward the polarizer is blocked, thereby ensuring durability without significant changes in physical properties or shape.

In addition, since the polarizing plate uses a second hard coating layer having a thickness of 10 μm or less, the thickness of the entire polarizing plate may be reduced with the effect of blocking water transfer and securing durability.

Specifically, the total thickness of the polarizer; the second hard coating layer; and the light-transmitting substrate may be 200 μm or less. For example, the polarizer may have a thickness of 40 μm or less, or 1 to 40 μm, the hard coating layer may have a thickness of 10 μm or less, or 1 to 10 μm, and the light-transmitting substrate may have a thickness of 150 μm or less. In this case, the polarizing plate and the display including the polarizing plate can be made thinner and lighter.

The polarizer has a structure in which a second hard coating layer having a thickness of 10 μm or less is located on one surface, and a light-transmitting substrate contained in the anti-reflective film can be located on the other surface. The light-transmitting substrate may have a thickness direction retardation (Rth) measured at a wavelength of 400 nm to 800 nm, of 5,000 nm or more, 7,000 to 50,000 nm, or 8,000 to 40,000 nm. If the thickness direction retardation (Rth) of the light-transmitting substrate included in the polarizing plate is less than 5,000 nm, deviation in reflectance and transmittance of each part of the anti-reflective film may be large, and a rainbow phenomenon may occur due to interference of visible light. On the other hand, the method and apparatus for measuring the retardation are as described in the above-mentioned anti-reflective film.

In addition, the light-transmitting substrate has different tensile strength values in one direction and a direction perpendicular to the one direction. For example, the ratio of the tensile strength in a direction perpendicular to the one direction to the tensile strength in one direction may be 2 or more, 3 or more, 4 to 30, or 5 to 20. In this case, the tensile strength in one direction has a value smaller than the tensile strength in a direction perpendicular to the one direction. If the ratio of the tensile strength of the light-transmitting substrate included in the polarizing plate is less than 2, the reflectance and the light transmittance deviation for each part of the anti-reflective film may be large, and a rainbow phenomenon may occur due to the interference of visible light.

The second hard coating layer having a thickness of 10 μm or less may be prepared by using the components and production methods known in the technical field to which the present disclosure belongs. For example, it may be a film having the same configuration as the hard coating layer included in the anti-reflective film.

On the other hand, the polarizer exhibits a characteristic capable of extracting only light vibrating in one direction from light made incident while vibrating in a plurality of directions. These properties can be achieved by stretching polyvinyl alcohol (PVA) that has absorbed iodine with strong tension. For example, The polarizer may be formed through a swelling step of immersing the PVA film in an aqueous solution and swelling it, a step of dyeing the swollen PVA film with a dichroic dye material that imparts polarization, a stretching step of stretching the dyed PVA film to arrange the dichroic dye materials side by side in a stretching direction, and a complementary color step of correcting the color of the PVA film subjected to the stretching step, but is not limited thereto.

The polyvinyl alcohol may be used without particular limitation as long as it includes a polyvinyl alcohol resin or a derivative thereof. At this time, the polyvinyl alcohol resin derivative may include polyvinyl formal resin, polyvinyl acetal resin, and the like, but is not limited thereto. Meanwhile, as the dichroic dye, an azo-based, anthraquinone-based, tetrazin-based, etc. may be used, but is not limited thereto. In addition, the polyvinyl alcohol film may be a commercially available polyvinyl alcohol film generally used in the manufacture of polarizers in the art, for example, P30, PE30, PE60 (Kuraray Co., Ltd., Japan), and M3000, M6000 (Nippon Synthetic Chemical Industry Co., Ltd.).

Meanwhile, the polyvinyl alcohol film may have a degree of polymerization of 1000 to 10000 or 1500 to 5000, but is not limited thereto. When the degree of polymerization satisfies the above range, the movement of the molecule is free and it can be flexibly mixed with iodine or a dichroic dye.

The polarizing plate may be used as an upper polarizing plate of a display, for example, a liquid crystal display (LCD). Further, in the laminated structure, the anti-reflective film may be located on the upper part. Specifically, the anti-reflective film may be located close to the viewer side of the display apparatus. By controlling the anti-reflection film so that it is located close to the viewer side of the display, water transfer can be blocked toward the polarizer to improve durability, and at the same time, reflection of light incident from the outside can be minimized to improve the sharpness of the screen.

Meanwhile, an adhesive layer may be further included on one surface of the second hard coating layer and/or the light-transmitting substrate in contact with the polarizer, and furthermore, other functional layers, such as an anti-pollution layer, may be further included between the layers or on the outermost side.

For example, the second hard coating layer and the light-transmitting substrate located on each side of the polarizer may be bonded by lamination using an adhesive or the like. The usable adhesive is not particularly limited as long as it is known in the art, and for example, water-based adhesives, one- or two-component polyvinyl alcohol (PVA)-based adhesives, polyurethane-based adhesives, epoxy-based adhesives, styrene butadiene rubber-based (SBR-based) adhesives, or hot melt adhesives may be mentioned.

Specifically, in the polarizing plate, a second hard coating layer, a polarizer, a light-transmitting substrate, a hard coating layer, and a low refractive index layer may be sequentially laminated. In addition, an adhesive layer may be further included on one surface of the second hard coating layer and/or the light-transmitting substrate in contact with the polarizer, Furthermore, other functional layers, such as an anti-pollution layer, may be further included between the layers or on the outermost side.

Triacetyl cellulose (TAC) film, which is often used as a polarizer protective film for polarizing plates, has weak water resistance, can be distorted in a high temperature/high humidity environment, and induces defects such as light leakage, wherein in the polarizing plate according to another embodiment, as the second hard coating layer and the anti-reflective film according to the embodiment are respectively used on both sides of the polarizer, durability can be ensured without significant changes in physical properties and shape even when exposed to high temperature and high humidity conditions for a long time.

In addition, since the polarizing plate uses a second hard coating layer having a thickness of 10 μm or less, a durable structure can be implemented through a thinner thickness than the structure of other previously known polarizing plate.

More specifically, the total thickness of the polarizer; the second hard coating layer; and the light-transmitting substrate may be 200 μm or less. For example, the polarizer may have a thickness of 40 μm or less, or 1 to 40 μm, the hard coating layer may have a thickness of 10 μm or less, or 1 to 10 μm, and the light-transmitting substrate may have a thickness of 150 μm or less.

According to another embodiment of the invention, a display apparatus including the above-mentioned anti-reflective film may be provided. A specific example of the display apparatus is not limited, and for example, it may be a device such as a liquid crystal display apparatus, a plasma display apparatus, or an organic light emitting diode device.

In one example, the display apparatus includes a liquid crystal display apparatus including a pair of polarizing plates opposite to each other; a thin film transistor, a color filter, and a liquid crystal cell which are sequentially stacked between the pair of polarizing plates; and a backlight unit.

In the display apparatus, the anti-reflective film may be provided on the outermost surface of a display panel at an observer side or a backlight side.

In the display apparatus including the anti-reflective film, the anti-reflective film may be positioned on one surface of the polarizing plate that is relatively far from the backlight unit among the pair of polarizing plates.

In addition, the display apparatus may include a display panel, a polarizing film provided on at least one surface of the panel, and an anti-reflective film provided on the opposite surface making contact with the panel of the polarizing film.

Advantageous Effects

According to the present disclosure, there can be provided an anti-reflective film capable of realizing high scratch resistance and anti-fouling property simultaneously while having low reflectance and high light transmittance deviation, and further capable of enhancing screen sharpness of a display apparatus, a polarizing plate including the anti-reflective film, and a display apparatus including the anti-reflective film.

BRIEF DESCRIPTION OF THE DRAWINGS

FIG. 1 is an X-ray diffraction (XRD) pattern for the anti-reflective film of Example 1.

FIG. 2 is an X-ray diffraction (XRD) pattern of the anti-reflection film of Comparative Example 3.

Hereinafter, the present disclosure will be described in more detail by way of Examples. However, these Examples are given for illustrative purposes only, and the scope of the invention is not intended to be limited to or by these Examples.

PREPARATION EXAMPLE 1: COATING SOLUTION FOR FORMING HARD COATING LAYER

The components shown in Table 1 were mixed to prepare a coating solution (B1, B2 and B3) for forming a hard coating layer.

TABLE 1

| (unit: g) | B1 | B2 | B3 |
| --- | --- | --- | --- |
| DPHA | | 6.237 | |
| PETA | 16.421 | 10.728 | 13.413 |
| UA-306T | 3.079 | 2.069 | 6.114 |
| 8BR-500 | 6.158 | 6.537 | 6.114 |
| IRG-184 | 1.026 | 1.023 | 1.026 |
| Tego-270 | 0.051 | 0.051 | 0.051 |
| BYK350 | 0.051 | 0.051 | 0.051 |
| 2-butanol | 25.92 | 32.80 | 36.10 |
| IPA | 45.92 | 38.80 | 35.70 |
| XX-103BQ(2.0 μm RI 1.515) | 0.318 | 0.460 | 0.600 |
| XX-113BQ(2.0 μm RI 1.555) | 0.708 | 0.563 | 0.300 |
| MA-ST(30% in MeOH) | 0.342 | 0.682 | 0.542 |

DPHA: dipentaerythritol hexaacrylate
PETA: pentaerythritol triacrylate
UA-306T: urethane acrylate, reaction product with toluene diisocyanate and pentaerythritol triacrylate (manufactured by Kyoeisha Chemical)
8BR-500: photocurable urethane acrylate polymer (Mw 200,000, Taisei Fine Chemical)
IRG-184: initiator (Irgacure 184, Ciba Specialty Chemicals)
Tego-270: leveling agent (Tego company)
BYK350: leveling agent (BYK-Chemie)
IPA: isopropyl alcohol
XX-103BQ(2.0 μm, RI 1.515): copolymerized particles of polystyrene and polymethyl methacrylate (Sekisui Plastic)
XX-113BQ(2.0 μm, RI 1.555): copolymerized particles of polystyrene and polymethyl methacrylate (Sekisui Plastic)
MA-ST(30% in MeOH): Dispersion in which silica nanoparticles with a size of 10~15 nm are dispersed in methyl alcohol (Nissan Chemical)

PREPARATION EXAMPLE 2-1: PREPARATION OF COATING LIQUID (C1) FOR FORMING LOW REFRACTIVE INDEX LAYER 100 g of trimethylolpropane triacrylate (TMPTA), 283 g of hollow silica nanoparticles (diameter range: about 42 nm to 66 nm, JSC Catalyst and Chemicals), 59 g of solid silica nanoparticles (diameter range: about 12 nm to 19 nm), 115 g of a first fluorine-containing compound (X-71-1203M, ShinEtsu), 15.5 g of a second fluorine-containing compound (RS-537, DIC Corporation) and 10 g of an initiator (Irgacure 127, Ciba) were diluted with a MIBK (methyl isobutyl ketone) solvent so as to have a solid content of 3 wt % t, thereby preparing a coating liquid for forming a low refractive index layer.

PREPARATION EXAMPLE 2-2: PREPARATION OF COATING LIQUID (C2) FOR FORMING LOW REFRACTIVE INDEX LAYER 100 g of Dipentaerythritol hexaacrylate (DPHA), 143 g of hollow silica nanoparticles (diameter range: about 51 nm to 72 nm, JSC Catalyst and Chemicals), 29 g of solid silica nanoparticles (diameter range: about 12 nm to 19 nm), 56 g of a fluorine-containing compound ((RS-537, DIC Corporation) and 3.1 g of an initiator (Irgacure 127, Ciba) were diluted with a MIBK (methyl isobutyl ketone) solvent so as to have a solid content of 3.5 wt % t, thereby preparing a coating liquid for forming a low refractive index layer.

EXAMPLES 1 TO 3 AND COMPARATIVE EXAMPLES 1 TO 4: PREPARATION OF ANTI-REFLECTIVE FILM

Each of the prepared coating liquids for forming a hard coating layer (B1, B2, B3) was coated onto the respective light-transmitting substrates (thickness 80 μm) listed in Table 2 below using a #12 Mayer bar, and then dried at a temperature of 60° C. for 2 minutes, and UV-cured to form a hard coating layer (coating thickness of 5 μm). H bulb was used as a UV lamp and curing a reaction was performed under nitrogen atmosphere. The amount of UV light irradiated upon curing was 100 mJ/cm$^2$.

The coating liquid (C1, C2) for forming the low reflective layer was coated onto the hard coating film using a #4 Mayer bar so that the thickness was about 110 to 120 nm, and then dried and cured at a temperature of 40° C. for 1 minute. During the curing, the dried coating was irradiated with ultraviolet light of 252 mJ/cm$^2$ under a nitrogen purge.

Cu-Kα rays having a wavelength of 1.54 Å, and X-ray diffraction (XRD) patterns of reflection mode was measured.

Specifically, the sample was prepared by fixing it so that it does not float on a low background Si holder (Bruker), and a Bruker AXS D4 Endeavor XRD was used as the measurement equipment. The voltage and current used were 40 kV and 40 mA, respectively. The devices and conditions used, such as optics and detectors, are as follows.

Primary (incident beam) optics: motorized divergence slit, soller slit 2.3°
Secondary (diffracted beam) optics: soller slit 2.3°
Receiving slit: 0.1 deg
LynxEye detector (1 D detector)
Measurement mode is coupled 2θ/θ mode, and using FDS (Fixed Divergence Slit) 0.3°, a region with a 2θ value from 6° to 70° was measured for 175 seconds every 0.04°.

In addition, the full width at half maximum of the peak appearing between the 2θ values of 22 to 24° in the X-ray diffraction (XRD) pattern was measured using the program TOPAS (Bruker). Specifically, in the program TOPAS, the measurement range (fitting area) was designated as 10 to 40°, and using the PV (pseudo-Voigt) function, peaks around 17°, 19°, 23°, and 26° were input to calculate the full width at half maximum. Thereafter, the 2θ value of the peak appearing between the 2θ values of 22 to 24° and the full width at half maximum of the peak are shown in Table 3 below.

Meanwhile, FIG. 1 is an X-ray diffraction (XRD) pattern for the anti-reflective film of Example 1. FIG. 2 is an X-ray diffraction (XRD) pattern of the anti-reflection film of Comparative Example 3.

2. Evaluation of Average Reflectance

The back side of the anti-reflective film obtained in Examples and Comparative Examples (one side of the light-transmitting substrate on which the hard coating layer was not formed) was subjected to dark color treatment, and then the average reflectance was measured in a wavelength region of 380 to 780 nm using a reflectance mode of a Solidspec 3700 (SHIMADZU) equipment, and the results are shown in Table 3 below.

3. Evaluation of Average Reflectance Deviation 20 arbitrary points were selected for the anti-reflective film obtained in Examples and Comparative Examples, and

TABLE 2

| | Anti-refractive film | | | |
|---|---|---|---|---|
| | Light-transmitting substrate | | | |
| | Tensile strength ratio* | Thickness direction retardation (Rth, nm) | Hard coating layer | Low refractive index layer |
| Example 1 | 4.1 | 9300 | Coating solution (B1) | Coating solution (C1) |
| Example 2 | 4.0 | 9200 | Coating solution (B2) | Coating solution (C1) |
| Example 3 | 2.9 | 9230 | Coating solution (B2) | Coating solution (C1) |
| Example 4 | 3.7 | 9300 | Coating solution (B3) | Coating solution (C1) |
| Example 5 | 2.2 | 5800 | Coating solution (B1) | Coating solution (C2) |
| Comparative Example 1 | 1.8 | 3500 | Coating solution (B3) | Coating solution (C1) |
| Comparative Example 2 | 1.6 | 3000 | Coating solution (B2) | Coating solution (C1) |
| Comparative Example 3 | 1.3 | 3200 | Coating solution (B2) | Coating solution (C1) |
| Comparative Example 4 | 1.8 | 1500 | Coating solution (B1) | Coating solution (C2) |

*Tensile strength ratio: In a light-transmitting substrate, the ratio of the tensile strength in a direction perpendicular to the one direction having a larger value to the tensile strength in one direction having a smaller value. The tensile strength measurement method: the tensile strength of the light-transmitting substrate is measured in accordance with JIS C-2318.

Evaluation

1. X-Ray Diffraction (XRD) Evaluation of Reflection Mode

For the anti-reflective film obtained in Examples and Comparative Examples, a sample was prepared in a size of 2 cm*2 cm (horizontal*vertical), and then irradiated with the average reflectance was measured for each point by "2. Evaluation method of average reflectance". Then, the arithmetic average value of the average reflectance of the measured 20 points was calculated. Then, the difference (absolute value) between the average reflectance for each point and the arithmetic mean value was defined as the average reflectance deviation, and the average reflectance deviation was calculated at each of the 20 points. The average reflectance deviation having the largest value among 20 average reflectance deviations is shown in Table 3 below.

4. Evaluation of Light Transmittance Deviation 20 arbitrary points were selected for the anti-reflective film obtained in Examples and Comparative Examples, and the light transmittance was measured for each point.

Specifically, the anti-reflective film was measured for average transmittance in a wavelength range of 380 to 780 nm using the transmittance mode of the Solidspec 3700 (SHIMADZU) equipment.

Then, the arithmetic average value of the light transmittance of the 20 measured points was calculated. Then, the difference (absolute value) between the light transmittance at each point and the arithmetic mean value was defined as the transmittance deviation, and the light transmittance deviation was calculated at each 20 points. The light transmittance deviation having the largest value among the twenty light transmittance deviations is shown in Table 3 below.

5. Evaluation of Moisture Permeability

The moisture permeability of the anti-reflective film obtained in Examples and Comparative Examples was measured using a MOCON test equipment (PERMATRAN-W, MODEL 3/61) under a temperature of 38° C. and 100% relative humidity.

4 had a remarkably high average reflectance deviation and light transmittance deviation, unlike the anti-reflective films of Examples 1 to 5.

PREPARATION EXAMPLE 3: PREPARATION OF A POLARIZER HAVING A SECOND HARD COATING LAYER FORMED ON ONE SURFACE (1) Preparation of Coating Solution (A) for Forming a Second Hard Coating Layer 28 g of trimethylloylpropane triacrylate, 2 g of KBE-403, 0.1 g of initiator KIP-100f, and 0.06 g of leveling agent (Tego wet 270) were uniformly mixed to prepare a coating solution (A) for forming a second hard coating layer.

(2) Preparation of a Polarizer Having a Second Hard Coating Layer Formed on One Side The coating solution (A) for forming the second hard coating layer was applied to one surface of a polyvinyl alcohol polarizer (thickness: 25 um, manufacturer: LG Chem) as a polarizer to a thickness of 7 um, and the dried coating was irradiated with ultraviolet rays of 500 mJ/cm$^2$ under nitrogen purge to prepare a polarizer in which a second hard coating layer is formed on one surface.

EXAMPLES 6 TO 10 AND COMPARATIVE EXAMPLES 5 TO 8: PREPARATION OF POLARIZING PLATE

As shown in Table 4 below, a polarizer in which the second hard coating layer obtained in Preparation Example 3 was formed on one surface was bonded to the light-transmitting substrate of the anti-reflective films obtained in

TABLE 3

|  | Peak (°) | Full width at half maximum (°) | Average reflectance (%) | Average reflectance deviation (% p) | light transmittance deviation (% p) | Moisture permeability (g/m$^2$ · day) |
| --- | --- | --- | --- | --- | --- | --- |
| Example 1 | 22.9 | 1.34 | 1.13 | 0.04 | 0.01 | 11.13 |
| Example 2 | 22.9 | 1.40 | 1.27 | 0.11 | 0.08 | 10.28 |
| Example 3 | 23.0 | 1.45 | 1.11 | 0.07 | 0.03 | 12.31 |
| Example 4 | 22.9 | 1.38 | 1.03 | 0.16 | 0.04 | 11.51 |
| Example 5 | 22.9 | 1.35 | 1.58 | 0.05 | 0.07 | 10.95 |
| Comparative Example 1 | 23.0 | 1.73 | 1.15 | 0.31 | 0.29 | 11.33 |
| Comparative Example 2 | 22.8 | 1.59 | 1.22 | 0.25 | 0.28 | 10.82 |
| Comparative Example 3 | 23.2 | 1.81 | 1.0 | 0.28 | 0.3 | 11.18 |
| Comparative Example 4 | 23.0 | 1.51 | 1.54 | 0.30 | 0.31 | 12.36 |

According to Table 3, it was confirmed that the anti-reflective films of Examples 1 to 5 had an average reflectance deviation of 0.16% p or less, a light transmittance deviation of 0.08% p or less, and thus there was almost no difference between average reflectance and transmittance in the entire anti-reflective film. However, it was confirmed that the anti-reflective films of Comparative Examples 1 to Examples 1 to 5 and Comparative Examples 1 to 4 using a UV adhesive to prepare a polarizing plate. Specifically, a polarizing plate was prepared so that the light-transmitting substrate of the anti-reflective film and the polarizer were in direct contact with each other. The prepared polarizing plate was sequentially laminated with a refraction layer, a hard coating layer, a light-transmitting substrate, a polarizer, and a second hard coating layer.

TABLE 4

|  | Anti-refractive film | Polarizer with a second hard coating layer formed |
| --- | --- | --- |
| Example 6 | Example 1 | Preparation Example 3 |
| Example 7 | Example 2 | Preparation Example 3 |
| Example 8 | Example 3 | Preparation Example 3 |
| Example 9 | Example 4 | Preparation Example 3 |

TABLE 4-continued

|  | Anti-refractive film | Polarizer with a second hard coating layer formed |
|---|---|---|
| Example 10 | Example 5 | Preparation Example 3 |
| Comparative Example 5 | Comparative Example 1 | Preparation Example 3 |
| Comparative Example 6 | Comparative Example 2 | Preparation Example 3 |
| Comparative Example 7 | Comparative Example 3 | Preparation Example 3 |
| Comparative Example 8 | Comparative Example 4 | Preparation Example 3 |

Evaluation

1. Evaluation of Average Reflectance Deviation and Light Transmittance Deviation For Examples 6 to 10 and Comparative Examples 5 to 8, the average reflectance deviation and the light transmittance deviation were measured by the same method as described above, and the results are shown in Table 5 below.

2. Crack Characteristics

For Examples 6 to 10 and Comparative Examples 5 to 8, they cut into a square where the length of one side was 10 cm was bonded to one surface of the glass for TV (12 cm wide, 12 cm long, and 0.7 mm thick) using an adhesive agent to prepare a sample for thermal shock evaluation. At this time, the polarizing plate was cut so that the MD direction of the polarizer was parallel to one side of the square. The cut sample was placed upright on a thermal shock chamber. The process in which the temperature was raised from room temperature to 80° C. and left for 30 minutes, after which the temperature was lowered to −30° C. and left for 30 minutes, and then the temperature was controlled to room temperature was defined as 1 cycle, and a total of 100 cycles were repeated. Subsequently, the cracks occurred between the polarizers of the sample and the gaps formed between the polarizing plates were confirmed with the naked eye, and the number of occurrence of cracks with a length of 1 cm was confirmed. The results are shown in Table 5 blow.

TABLE 5

|  | Average reflectance deviation (% p) | Light transmittance deviation (% p) | Cracks |
|---|---|---|---|
| Example 6 | 0.05 | 0.03 | 0 |
| Example 7 | 0.12 | 0.05 | 0 |
| Example 8 | 0.05 | 0.04 | 0 |
| Example 9 | 0.13 | 0.06 | 0 |
| Example 10 | 0.04 | 0.05 | 0 |
| Comparative Example 5 | 0.27 | 0.3 | 2 |
| Comparative Example 6 | 0.30 | 0.29 | 3 |
| Comparative Example 7 | 0.29 | 0.35 | 3 |
| Comparative Example 8 | 0.35 | 0.33 | 4 |

According to Table 5, it was confirmed that the polarizing plates of Examples 6 to 10 had an average reflectance deviation of 0.13% p or less and a light transmittance deviation of 0.06% p or less, and there was almost no difference between the average reflectance and transmittance in the entire polarizing plate, and there was no deviation for each part of visibility. However, the polarizing plates of Comparative Examples 5 to 8 have remarkably high deviations in average reflectance and light transmittance, unlike the polarizing plates of Examples 6 to 8, and thus it can be predicted that a large deviation in visibility for each part will appear.

In addition, it was confirmed that no cracks were generated in the 100-cycle repeated crack test in Examples 6 to 10 in which the average reflectance and the light transmittance deviation were low. On the other hand, it was confirmed that cracks occurred in the polarizing plates of Comparative Examples 5 to 8.

What is claimed is:

1. An anti-reflective film comprising: a light-transmitting substrate; a hard coating layer; and a low refractive index layer,
   wherein in a X-ray diffraction (XRD) pattern of reflection mode, a full width at half maximum (FWHM) of a peak appearing at 2θ value of 22 to 24° is 1.5° or less, and
   wherein the low refractive index layer comprises a binder resin, and inorganic fine particles dispersed in the binder resin.

2. The anti-reflective film according to claim 1, wherein, the light-transmitting substrate has a moisture permeability of 50 g/m2·day or less under the conditions of a temperature of 30 to 40° C. and a relative humidity of 90 to 100%.

3. The anti-reflective film according to claim 1, wherein, the binder resin comprises a crosslinked polymer between a photopolymerizable compound and a fluorinated compound containing a photoreactive functional group.

4. The anti-reflective film according to claim 1, wherein, the inorganic fine particles comprise at least one selected from the group consisting of solid inorganic nanoparticles having a diameter of 0.5 to 100 nm and hollow inorganic nanoparticles having a diameter of 1 to 200 nm.

5. The anti-reflective film according to claim 1, wherein, the hard coating layer comprises a binder resin including a photocurable resin; and organic or inorganic fine particles dispersed in the binder resin.

6. The anti-reflective film according to claim 5, wherein, the binder resin of the hard coating layer further comprises a high molecular weight (co) polymer having a number average molecular weight of at least 10,000.

7. The anti-reflective film according to claim 1, wherein, the light-transmitting substrate has a retardation (Rth) in the thickness direction measured at a wavelength of 400 nm to 800 nm, of at least 5,000 nm, and
   a ratio of a tensile strength in a direction perpendicular to one direction to a tensile strength in the one direction is at least 2.

8. The anti-reflective film according to claim 1, wherein, the light-transmitting substrate is a polyethylene terephthalate film.

9. The anti-reflective film according to claim 1, wherein, the anti-reflective film has an average reflectance of 2.0% or less in the visible light wavelength range of 380 nm to 780 nm.

10. The anti-reflective film according to claim 1, wherein, the anti-reflective film has an average reflectance deviation of 2.0% p or less, and
a light transmittance deviation of 0.2% p or less.

11. A polarizing plate comprising the anti-reflective film according to claim 1 and a polarizer.

12. A polarizing plate comprising
a polarizer;
a second hard coating layer having a thickness of 10 μm or less; and
the anti-reflective film according to claim 1,
wherein the second hard coating layer and the anti-reflective film are positioned opposite to each other based on the polarizer.

13. A polarizing plate according to claim 12, wherein,
a total thickness of the polarizer, the second hard coating layer, and the anti-reflective film is 200 μm or less.

14. A polarizing plate according to claim 12, wherein,
the second hard coating layer having a thickness of 10 μm or less is located on one surface of the polarizer, and the light-transmitting substrate of the anti-reflective film is located on the other surface of the polarizer,
the light-transmitting substrate has a retardation (Rth) of at least 5,000 nm in the thickness direction measured at a wavelength of 400 nm to 800 nm,
the light-transmitting substrate has a tensile strength in a direction perpendicular to one direction to a tensile strength in the one direction is at least 2, and
the tensile strength in the one direction has a value smaller than the tensile strength in a direction perpendicular to the one direction.

15. A display apparatus comprising the anti-reflective film according to claim 1.

\* \* \* \* \*